Figure 1:
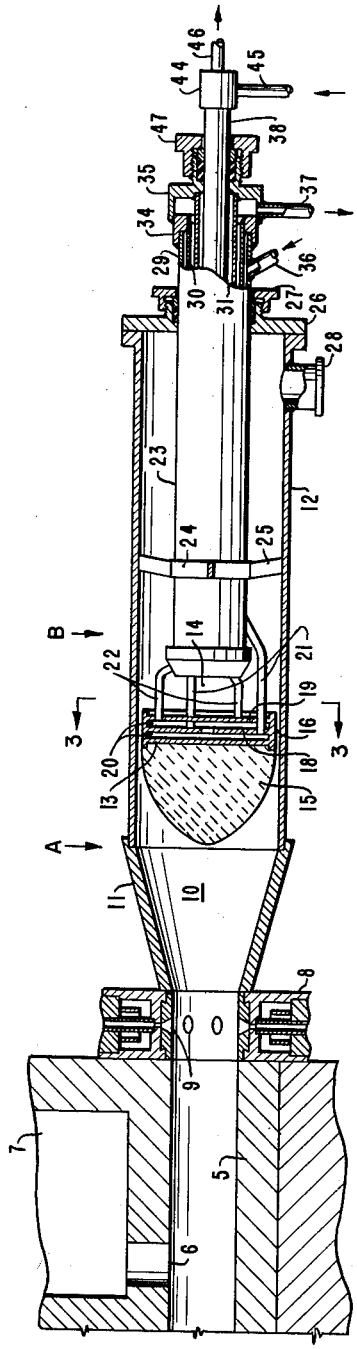

Dec. 1, 1964    M. KOLIJN ETAL    3,159,458
QUENCH GUN FOR REACTOR PRODUCING ACETYLENE AND THE LIKE
Filed June 19, 1961

INVENTORS:
MARTINUS KOLIJN
LEONARD W. TER HAAR
JOHANNES A. TE NUYL

BY: *Oswald H. Milmore*
THEIR ATTORNEY 3,159,458
QUENCH GUN FOR REACTOR PRODUCING
ACETYLENE AND THE LIKE
Martinus Kolijn, Leonard W. Ter Haar, and Johannes A.
Te Nuyl, all of The Hague, Netherlands, assignors to
Shell Oil Company, New York, N.Y., a corporation of
Delaware
Filed June 19, 1961, Ser. No. 118,010
Claims priority, application Great Britain, June 29, 1960,
22,774/60
8 Claims. (Cl. 23—277)

The invention relates to reactors suitable for effecting short-time, high-temperature reactions, such as those wherein hydrocarbons are reacted to produce acetylene-containing gas mixtures. Such mixtures are obtained by injecting a suitable hydrocarbon reactant, either a pure hydrocarbon or a mixture of hydrocarbons, into hot combustion gases and subsequently quenching the reaction mixture containing olefins, particularly acetylene. The term "reactor" will hereinafter be used to refer to reactors of this type.

A process for the conversion of hydrocarbons by admixture with hot combustion gases is described, for example, in the copending application of Ter Haar, one of the applicants herein, Serial No. 93,049, filed March 3, 1961. A burner suitable for the combustion stage of such process is also described in the U.S. patent to Te Nuyl, one of the applicants herein, No. 2,806,517, dated September 17, 1957.

It is known that in such processes it is desirable to keep the reaction time as short as possible, for example, in the order of magnitude of thousandths of seconds, the unstable acetylene formed at a temperature exceeding 1000° C. then being rapidly cooled, preferably to below 600° C., by injection of a quenching medium, usually water. In this connection it is particularly important that the reaction space and the quenching space should be separated one from the other by suitable means so as to prevent the temperature in one space from adversely affecting the temperature in the other space, since it will be clear that without such separation the temperature of the quenching space would be at least locally increased through radiation from the reaction space in which a temperature of over 1000° C. prevails. Further, the reduction of the temperature in the reaction space due to such radiation or the direct contact of the reacting medium with the quenching medium would adversely affect the acetylene yield.

Apparatus are known in which the reaction space and the quenching space are separated from each other, for example, from the U.S. patent to Schrader, No. 2,790,838, dated April 30, 1957, and the article in Chemical Engineering Progress, vol. 54, No. 1, January 1958, "Eastman Process for Cracking Light Hydrocarbons to Acetylene and Ethylene," by G. A. Akin, T. F. Reid and R. J. Schrader. These known apparatus comprise a long reaction chamber of relatively small diameter. They are thermodynamically unattractive owing to the large wall surface, since a relatively larger heat loss results via the wall than in shorter, wider reaction chambers. A further drawback of such apparatus is that the quenching medium may come into direct contact with the reacting media still present in the reaction space.

One of the objects of this invention is to overcome these drawbacks and to provide apparatus by means of which the various process variables, in particular the reaction time and the quenching time, can be controlled in a better manner than has hitherto been possible.

To this end the invention provides a reactor wherein the quenching space is separated from the reaction space by a single partition which is provided with heat-insulating material, such as ceramic, on the side adjacent to the reaction space, at least one opening being formed in the partition to allow the passage of gaseous media from the reaction space to the quenching space.

The essential feature of the single partition here referred to is that during operation of the reactor the gases to be quenched are led directly from the reaction space to the quenching space via one or more openings of short length, without first being led to an intermediate space, such as would otherwise be necessary for isolating the reaction and quenching spaces thermally and to prevent contact of quenching medium with the reacting gases.

The apparatus according to the invention enables a reaction zone to be given a large diameter and a short length, as a result of which the wall surface confining said zone may be favorably reduced and the heat loss from the reaction zone via the wall surface can be reduced to a minimum. A compact reactor, occupying little space, is also made possible, it being possible to build the quenching space directly adjacent to the reaction space, since the thermal insulating material sharply reduces heat transfer between the two spaces.

The reaction space and the quenching space are preferably cylindrical and coaxial with circular cross sections, and the partition is preferably circular and positioned at right-angles to the center line of said coaxial spaces. This arrangement, being one of symmetry about an axis, enables the reaction gases to have a uniform or substantially uniform residence time in the reaction space, resulting in an optimum conversion. In the above-mentioned known apparatus, the design is such that the reaction products are first passed around a corner before being quenched. This means that the reaction gases have to traverse unequal distances when passed to the quenching space, so that it is impossible to achieve a uniform residence time in the reaction space.

The opening which allows the passage of the gaseous media from the reaction space to the quenching space preferably consists of an annular opening between the cylindrical wall of the reaction space and the periphery of the circular partition, so that the reaction gases passing to the quenching space via the annular opening are uniformly distributed about the circumference of the quenching space, leading to a more uniform distribution with respect to the quenching means. The side of the partition adjacent to the reaction space may be convex, e.g., conical or rounded, preferably having a surface of revolution which is convex toward the reaction space, e.g., shaped as a paraboloid, thereby enabling the reacting gases to be channelled uniformly into the annular opening.

The side of the partition adjacent to the quenching space is preferably provided with cooling means in order to protect the supporting structure of the partition from excessive heat load and also to insure that the partition has a sufficiently low temperature.

The cooling means is preferably formed by ducts through which a coolant is circulated adjacent to the quenching space to avoid heating the quenching space by radiation. According to the invention the supply and discharge lines for the cooling ducts may form part of the structure by which the partition is supported.

The quenching apparatus preferably consists of an atomizer gun disposed centrally within the quenching space, an atomizer being mounted at the end of said gun nearest the partition, said atomizer being of the type which atomizes the quenching liquid in the form of a hollow spray cone. The dimensions of the hollow cone are preferably such that the gaseous reaction product is hit immediately upon entering the quenching space. A pressure atomizer provided with a vortex chamber is very suitable for this purpose and because the arrangement is, in its preferred embodiments, entirely axially symmetrical uniform contact can be established between the quenching liquid and the reaction gases. A practical embodiment of the invention is that in which the supporting structure of the partition which, as described above, comprises the supply and discharge lines of the partition cooling system, is secured to the holder of the atomizer gun. This holder preferably consists of a tube mounted outside the atomizer gun in such a manner that the said gun is axially slidable therein.

According to the invention the atomizer gun may be axially adjustable relative to the partition; the partition is also preferably made axially movable with respect to the walls which enclose the reaction and quenching spaces so that the volumes thereof may be varied, the atomizer gun holder being movable together with the partition due to its being secured to the supporting structure for the partition.

Figure 2:
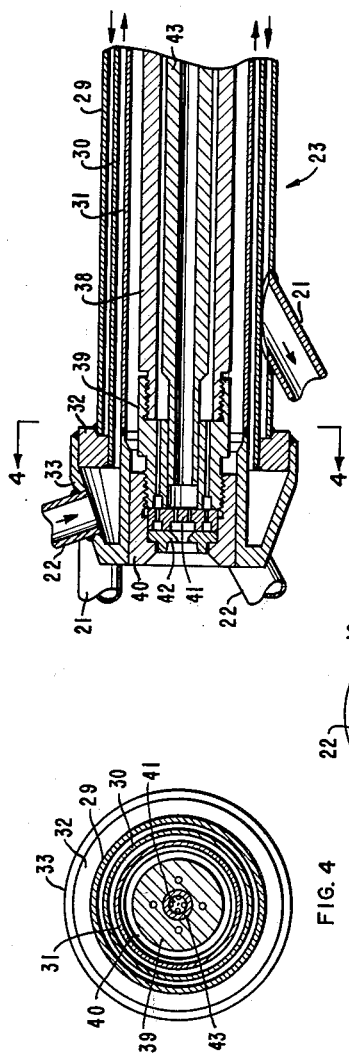
Figure 4:
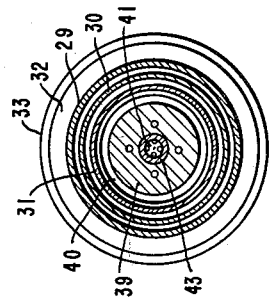
Figure 3:
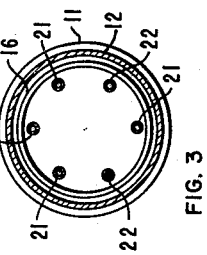

The invention will be further described with reference to the accompanying drawings forming a part of this specification and showing one preferred embodiment, wherein:

FIGURE 1 is a longitudinal sectional view of parts of a reactor, including the reaction space, the quenching space and the partition, the quench atomizer gun being shown in elevation;

FIGURE 2 is an enlarged longitudinal sectional view of the quench atomizer gun shown in FIGURE 1; and FIGURES 3 and 4 are transverse sectional views taken on the lines 3—3 and 4—4, respectively.

The reactor shown is of the type in which a hydrocarbon is injected into hot combustion gases according to the processes referred to in the aforementioned patent application.

Referring to the drawings, 5 represents a duct providing a channel to which hot combustion products are admitted by a port 6 from a gasifying reactor or combustion device of which the space 7 is a part. This device may, for example, be of the type described in the aforesaid Patent 2,806,517. The hot combustion gases flow axially through a hydrocarbon injector ring 8 having a plurality of radially directed injection openings 9 distributed for uniform injection of the hydrocarbon, e.g., arranged at equal angular intervals in a common plane normal to the axis. A hydrocarbon or mixture of hydrocarbons to be reacted is admitted through these radial openings for intimate mixing with the hot combustion gases, so as to be rapidly heated thereby. Immediately downstream from the injector ring is the reaction space 10, bounded at the entrance by a diverging, e.g., a frustoconical wall 11 which is connected to a cylindrical wall 12 having a circular cross section and enclosing the rear part of the reaction space, the partition 13 which defines the rear end of the reaction space, and the quenching space 14. The partition includes a layer 15 of thermal insulating material, such as a ceramic, on the front face thereof, nearer the reaction space, and is circular in outline and of diameter to provide an annular opening 16 between itself and the wall 12. Preferably, the front face of the partition is a convex surface of revolution, e.g., parabolic in cross section as shown. The partition further includes plates 18 and 19, the former having a central port and said plates defining a pair of flat, centrally intercommunicating channels or chambers 20 for the circulation of a cooling fluid.

Coolant is supplied to the forward cooling channel by a plurality of pipes 21 and discharged from the rear channel by a second plurality of pipes 22. These pipes also act as a supporting structure for the partition and are secured to the front of an axially slidable tubular structure 23 which serves also as a holder for the atomizing gun described hereinafter. The structure 23 is supported by a stationary ring 24 having radial vanes 25 by which the ring is fixed to the wall 12, and extends through the rear wall 26 of the reactor, where it has a sealed connection 27. This connection may be water-cooled. The wall 12 has an outlet nozzle 28 by which the quenched reaction gases are discharged.

As is shown in FIGURE 2, the tubular structure 23 comprises three concentric, radially spaced tubes 29, 30 and 31 welded at the front to a ring 32 and a housing 33 which encloses an annular space in communication with the return passage between the tubes 30 and 31. The coolant return pipes 22 are fixed to the housing by welding and the supply pipes 21 to the outermost tube 29 to receive coolant from the passage between the tubes 29 and 30. At the rear end of the structure these tubes are fixed by welding to a ring 34 and housing 35 (FIGURE 1). The coolant is supplied to the space between the tubes 29 and 30 via a pipe 36 and discharged from the space between the tubes 30 and 31 via a pipe 37.

A cylindrical, tubular atomizer gun 38 is mounted within the tubular structure 23. Advantageously, the gun 38 is axially slidable with respect to the tubular structure. The front end of the gun has threadedly secured thereto an atomizer body 39 to which is threaded a cap 40 which retains a whirl-chamber plate 41 and an orifice plate 42 and which is slidable within the housing 33. In the embodiment shown the atomizer is of the return type; therefore the gun further contains an inner tube 43 defining therein a return channel which communicates with the central part of the whirl chamber via axial ports therein. The atomizer per se is well known and is not further described herein. It is supplied with liquid under pressure by the annular passage between the gun 38 and the tube 43 and excess liquid is returned through the latter tube. It is evident that other forms of atomizers capable of producing a hollow spray cone of atomized liquid may be used. The gun carries at the rear end thereof a hollow fitting 44 by which connection is made to liquid supply and return pipes 45 and 46, respectively (FIGURE 1). Axial adjustment of the gun with respect to the tubular structure 23 is possible by sealing these parts as indicated at 47.

The atomizer is designed and/or adjusted axially to emit the quenching medium in the form of a hollow cone which engages the reaction gas immediately upon discharge from the annular passage 16, the cone being symmetrical about the axis of the spray cone and the opening 16. By making the pipes 21 and 22 of small diameter there is but little interference with the spray.

When the tubular structure 23 is adjusted axially the atomizer moves with it, so that readjustment of the position of the atomizer is not necessary. When the partition is in the position at A, as shown, the size of the reaction space 10 is at a minimum, while when it is in the position designated B, the reaction space is maximum.

It should be noted that the apparatus according to the invention is suitable not only for carrying out processes in which acetylene is produced by adding hydrocarbons to hot combustion gases, but also in the known processes in which hydrocarbons are subjected to partial combustion with oxygen in a reaction space, at least a part of the reactants being converted directly into acetylene or olefins, and for other reactions carried out at elevated temperature which must be quenched rapidly.

We claim as our invention:

1. A reactor for effecting high-temperature, short-time pyrolytic reactions which comprises a closed vessel having a cylindrical wall of circular cross section, a partition wall within said vessel disposed at right angles to the axis of said spaces and compartmenting the vessel into a reaction space and a quenching space which are situated on opposite sides of the partition wall and are coaxially related, said partition wall having a circular periphery, being smaller than said cylindrical wall, and having a limited thickness to leave a short annular slot which is in direct and free communication with both said spaces for the rapid passage of reacting gas from the reaction space into the quenching space, said partition being imperforate within said periphery, means for continuously admitting reactants to said reaction space, an atomizing nozzle within said quenching space and directed toward said partition wall and positioned to emit a spray of coolant wholly within the quenching space toward said slot to engage said reacting gas immediately upon entering the quenching space, means for supplying a coolant to said nozzle, and an outlet for discharging quenched gas from the quenching space.

2. A reactor as defined in claim 1 wherein the face of said partition wall adjacent to the reaction space is convex and formed as a surface of revolution about the said axis.

3. A reactor for effecting high-temperature, short-time pyrolytic reactions which comprises a closed vessel, a partition wall within said vessel compartmenting it into a reaction space and a quenching space, said partition wall providing at least one short opening for the passage of reacting gas from the reaction space into the quenching space, means for continuously admitting reactants to said reaction space, a support structure situated within said quenching space in spaced relation to said partition wall, quenching means within said quenching space including an atomizing nozzle positioned to emit a spray of coolant wholly within the quenching space and directed to engage said reacting gas immediately upon entering the quenching space, means for supplying a quench liquid to said nozzle including at least one pipe interconnecting said support structure and said wall and constituting the support for said wall, and an outlet for discharging quenched gas from the quenching space.

4. A reactor as defined in claim 3 wherein the said atomizing nozzle is mounted on said support structure, said partition wall, atomizer and support structure being movable as a unit to vary the size of said reaction space.

5. A reactor as defined in claim 3 wherein said atomizing nozzle is axially movable with respect to said support structure.

6. A reactor for effecting high-temperature, short-time pyrolytic reactions which comprises a closed vessel having at least a part of the side wall thereof cylindrical in shape and circular in cross section, a single circular partition wall within said cylindrical portion compartmenting the vessel into a reaction space and a quenching space and positioned normally to the cylindrical axis, said partition wall having thermal insulating material on the side thereof adjacent to the reaction space and having a diameter smaller than that of the vessel wall to form therewith a short annular opening in direct communication with both said spaces for the rapid passage of reacting gases from the reaction space into the quenching space, inlet means disposed at said axis for continuously admitting reactants to said reaction space in a direction toward the partition wall, quenching means within said quenching space including an atomizing nozzle of the type which emits a hollow spray of liquid, said nozzle being directed toward said partition wall and positioned to emit said spray wholly within said quenching space and toward said annular opening to engage reacting gases immediately upon entering the quenching space from said annular opening with said spray cone, means for supplying quench liquid to said nozzle, and an outlet for discharging quenched gas from the quenching space.

7. A reactor as defined in claim 6 wherein said partition wall includes passageways for the circulation of a coolant, said reactor including a tubular structure extending rearwardly through said vessel on the same side of the partition wall as the quenching space, said structure including channels for the supply and return of said coolant, a coolant supply pipe and a coolant return pipe interconnecting the front end of said tubular structure and side partition wall and connected to support the said wall.

8. A reactor as defined in claim 7 wherein said atomizer comprises an atomizer gun contained within said tubular structure and having said atomizing nozzle mounted at the front thereof substantially on the said axis to emit a forwardly divergent spray.

References Cited in the file of this patent
UNITED STATES PATENTS

| | | |
|---|---|---|
| 2,529,598 | Deanesly | Nov. 14 1950 |
| 2,701,756 | Eastman et al. | Feb. 8, 1955 |
| 2,790,838 | Schrader | Apr. 30, 1957 |
| 2,838,585 | Lehrer | June 10, 1958 |
| 2,868,856 | Hale et al. | Jan. 13, 1959 |
| 2,884,472 | Bludworth | Apr. 28, 1959 |
| 2,889,209 | Hale | June 2, 1959 |
| 2,946,668 | Richelsen | July 26, 1960 |
| 2,967,762 | Krejci | Jan. 10, 1961 |
| 3,069,248 | Braconier et al. | Dec. 18, 1962 |